(12) United States Patent
Lee et al.

(10) Patent No.: US 6,252,979 B1
(45) Date of Patent: Jun. 26, 2001

(54) INTERACTIVE METHOD AND APPARATUS FOR SORTING BIOLOGICAL SPECIMENS

(75) Inventors: Shih-Jong J. Lee, Bellevue; Alan C. Nelson, Redmond; Carl E. Youngmann, Seattle, all of WA (US)

(73) Assignee: Tripath Imaging, Inc., Burlington, NC (US)

( * ) Notice: Subject to any disclaimer, the term of this patent is extended or adjusted under 35 U.S.C. 154(b) by 0 days.

(21) Appl. No.: 08/485,182

(22) Filed: Jun. 7, 1995

(51) Int. Cl.[7] .............................. G06K 9/00; G02B 21/00

(52) U.S. Cl. ...................... 382/133; 359/382; 427/2.11

(58) Field of Search .................................. 382/128–133, 382/224, 244, 245, 264; 356/39; 600/313, 309; 359/382; 427/2.11

(56) References Cited

U.S. PATENT DOCUMENTS

| | | | |
|---|---|---|---|
| 3,824,393 | 7/1974 | Brain | 250/222.1 |
| 4,034,342 | 7/1977 | Kruklitis | 382/273 |
| 4,122,518 | * 10/1978 | Castleman et al. | 382/129 |
| 4,175,860 | 11/1979 | Bacus | 356/39 |
| 4,183,013 | * 1/1980 | Agrawala et al. | 382/173 |
| 4,207,554 | 6/1980 | Resnick et al. | 382/133 |
| 4,513,438 | * 4/1985 | Graham et al. | 382/134 |
| 4,817,050 | * 3/1989 | Komatsu et al. | 64/920.7 |
| 4,965,725 | 10/1990 | Rutenberg | 382/224 |
| 5,018,209 | * 5/1991 | Bacus | 382/129 |
| 5,029,226 | 7/1991 | Klein et al. | 382/275 |
| 5,054,093 | 10/1991 | Cooper et al. | 382/159 |
| 5,068,906 | 11/1991 | Kosaka | 382/133 |
| 5,072,382 | 12/1991 | Kamentsky | 382/133 |
| 5,257,182 | 10/1993 | Luck et al. | 382/224 |
| 5,287,272 | 2/1994 | Rutenberg et al. | 382/224 |
| 5,315,700 | 5/1994 | Johnston et al. | 345/502 |
| 5,361,140 | 11/1994 | Hayenga et al. | 358/446 |
| 5,544,650 | 8/1996 | Boon et al. | 600/309 |

OTHER PUBLICATIONS

P. Burt et al. "The Laplacian Pyramid as a Compact Image Code", IEEEÛ ⬜ransactions on Communication, vol. COM–31, No. 4, Apr. 1983, pp. 532–540.*

Mackin et al., "Automated Three–Dimensional Image Analysis of Thick and Overlapped Clusters in Cytologic Preparations", The International Academy of Cytology, Jun. 17, 1993, pp. 405–417.*

Lee et al., "A Processing Strategy for Automated Papanicolaou Smear Screening", ©The International Academy of Cytology, *Analytical and Quantitative Cytology and Histology*, vol. 14, No. 5, Oct. 1992, pp. 415–425.

Bacus, James W. and Les J. Grace, "Optical Microscope System For Standardized Cell Measurements and Analyses", *Applied Optics*, 26:16, pp. 3280–3293, Aug. 15, 1987.

Bartels, Peter H., et al., "A Self–Learning Computer Program for Cell Recognition", *ACTA Cytologica: The Journal of Clinical Cytology*, 14:8, pp. 486–494, Oct. 1970.

Tanaka, Noboru, et al., "Automated Cytologic Screening System (CYBEST Model 4): an Integrated Image Cytometry System", Reprinted from *Applied Optics*, vol. 26, No. 16, pp. 3301–3307, Aug. 15, 1987. Copyright© 1987 by the Optical Society of America and reprinted by permission of the copyright owner.

Duda, Richard O. and Peter E. Hart, "Fisher's Linear Discriminant", *Patent Classification and Scene Analysis*, Copyright ©1973, pp. 114–119.

(List continued on next page.)

*Primary Examiner*—Jay Patel
(74) *Attorney, Agent, or Firm*—George A. Leone; Hans Sun; Emil Moffa

(57) ABSTRACT

An interactive process for sorting biological specimens includes the steps of processing a biological specimen to provide an analysis score, sorting the biological specimens according to the analysis score into categories including: clearly normal, interactive review, and microscopy review, and selecting a field-of-view (FOV) for the biological specimens sorted into the interactive review category.

51 Claims, 12 Drawing Sheets

OTHER PUBLICATIONS

Dytch, Harvey E. et al., "An Interactive Microcomputer–Based System for the Quantitative Analysis of Stratified Tissue Sections", *Analytical and Quantitative Cytology and Histology*, vol. 9, No. 1, pp. 69–78, Mar. 1987.

Enslein, Kurt and Peter W. Neurath, "Augmented Stepwise Discriminant Analysis Applied to Two Classification Problems in the Biomedical Field", *Computers and Biomedical Research*, 2, 568–581 (1969).

Kurman, Robert J. et al., "Part 1: Specimen Adequacy" and "Part 2: Descriptive Diagnoses", *The Bethesda System for Reporting Cervical/Vaginal Cytologic Diagnoses*, ©1994 Springer–Verlag.

Smith, Warren J., "Modern Optical Engineering: The Design of Optical Systems", Copyright ©1966 by McGraw–Hill Book Company, pp. 308–325.

Weber, J.E. et al., "Fuzzy Reasoning, Possibility Theory and Probability Theory in Expert Systems for Histopathology", Proceedings, 9th Annual IEEE Conference on Engineering in Medicine and Biomedical Sciences, Boston, pp. 1560–1561, ©1987.

Wied, G.L. et al., "Expert Systems as Classifiers in Diagnostic Cytopathology", IEEE/Ninth Annual Conference of the Engineering in Medicine and Biology Society, pp. 1915–1917, ©1987.

Wied, G.L. et al., "Expert System Design Under Uncertainty of Human Diagnosticians", IEEE/Eighth Annual Conference of the Engineering in Medicine and Biology Society, pp. 757–760, ©1986.

Wied, G.L. et al., "Ticas–Stratex, an Expert Diagnostic System For Stratified Cervical Epithelium", IEEE/Ninth Annual Conference of the Engineering in Medicine and Biology Society, pp. 1557–1559, ©1987.

Serra, J., *Image Analysis and Mathematical Morphology*, pp. 372–423, Academic Press, 1982.

Patten, Jr., Stanley, "Diagnostic Cytopathology of the Uterine Cervix", Basel, Switzerland, Publisher: S. Karger, 1969, 2nd Edition 1978, Third vol. in *Monographs in Clinical Cytology*, edited by G.L. Wied, pp. 10–15.

* cited by examiner

INTERACTIVE METHOD AND APPARATUS FOR SORTING BIOLOGICAL SPECIMENS

BACKGROUND OF THE INVENTION

1. Field of the Invention

The present invention is directed toward an interactive method for sorting biological specimens using data processing techniques and, more particularly, toward an interactive method for use in combination with image analysis apparatus for sorting cervical smears by processing fields of view of an image analysis microscope and sorting out normal specimens and selecting potentially abnormal specimens, where a technician may review selected fields of view of potentially abnormal specimens.

2. Discussion of the Prior Art

Automated and semi-automated methods of examining Papanicolaou-stained cervical smears, commonly referred to as pap smears, have been proposed in several articles and have been the subject of patents and patent applications since the 1970's. Cervical smears are typically contained on microscope slides which, in current practice, are individually examined by a cytotechnologist. Of course, this is an expensive and time intensive practice which is prone to human error.

In an effort to automate the cervical smear analysis process, some methods propose automatically scanning cervical smears and saving images of scanned objects, such as cells. Saved images may be classified and later displayed to a cytotechnologist for review and diagnosis. Unfortunately, such approaches do not provide contextual information for the object and, as a result, may not provide information with sufficient specificity for discerning suspicious objects. The result may be more false positive identifications of cervical smear samples. False positive identifications of objects result in normal slides being presented to cytotechnologists for human review. Human review of false positive slides or objects may not be necessary in many cases, thereby tending to increase the cost of applying such proposed methods.

The performance requirement for a fully automated cytology system may be very high, especially, as regards sensitivity to abnormal slides. An automated cytology system will ideally sort normal slides from abnormal slides with a very low rate of classifying normal slides as abnormal. In setting sort criteria at a level sufficient to provide a useful normal slide sort rate, severe abnormal slides may be missed by fully automated systems. Reliable systems that match such high performance requirements with existing technology are desirable so that a useful, cost effective, automated cytology system may be developed.

In contrast to the prior art, the present invention provides a slide sorting strategy comprised of a combination of fully automated processing and interactive review components that meet high performance standards without sacrificing sensitivity for identifying abnormal slides. The method of the invention sorts slides into clearly normal, interactive review, and microscopy review categories. Slides classified as clearly normal may be reported without further processing. Slides classified as needing microscopy review may be further processed by human review under a microscope. Images in the interactive review category may be saved for slides. In contrast to the prior art, the present invention provides a cost effective means to sort slides by classifying only about 20% of slides as clearly normal. Thus, high sensitivity requirements for identifying abnormal slides may be met by the method of the present invention. The present invention also includes several improvements to the human review process for reducing human false positive slides and improving the normal slide sort rate after human review. These improvements further increase the cost effectiveness of the method of the invention.

SUMMARY OF THE INVENTION

The present invention provides an interactive process for sorting biological specimens. A biological specimen is processed to provide an analysis score. The biological specimen is sorted according to the analysis score into categories including a clearly normal category, an interactive review category, and a microscopy review category. At least one field-of-view (FOV) is selected for any biological specimen sorted into the interactive review category.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

DESCRIPTION OF THE PREFERRED EMBODIMENT

Figure 1A:
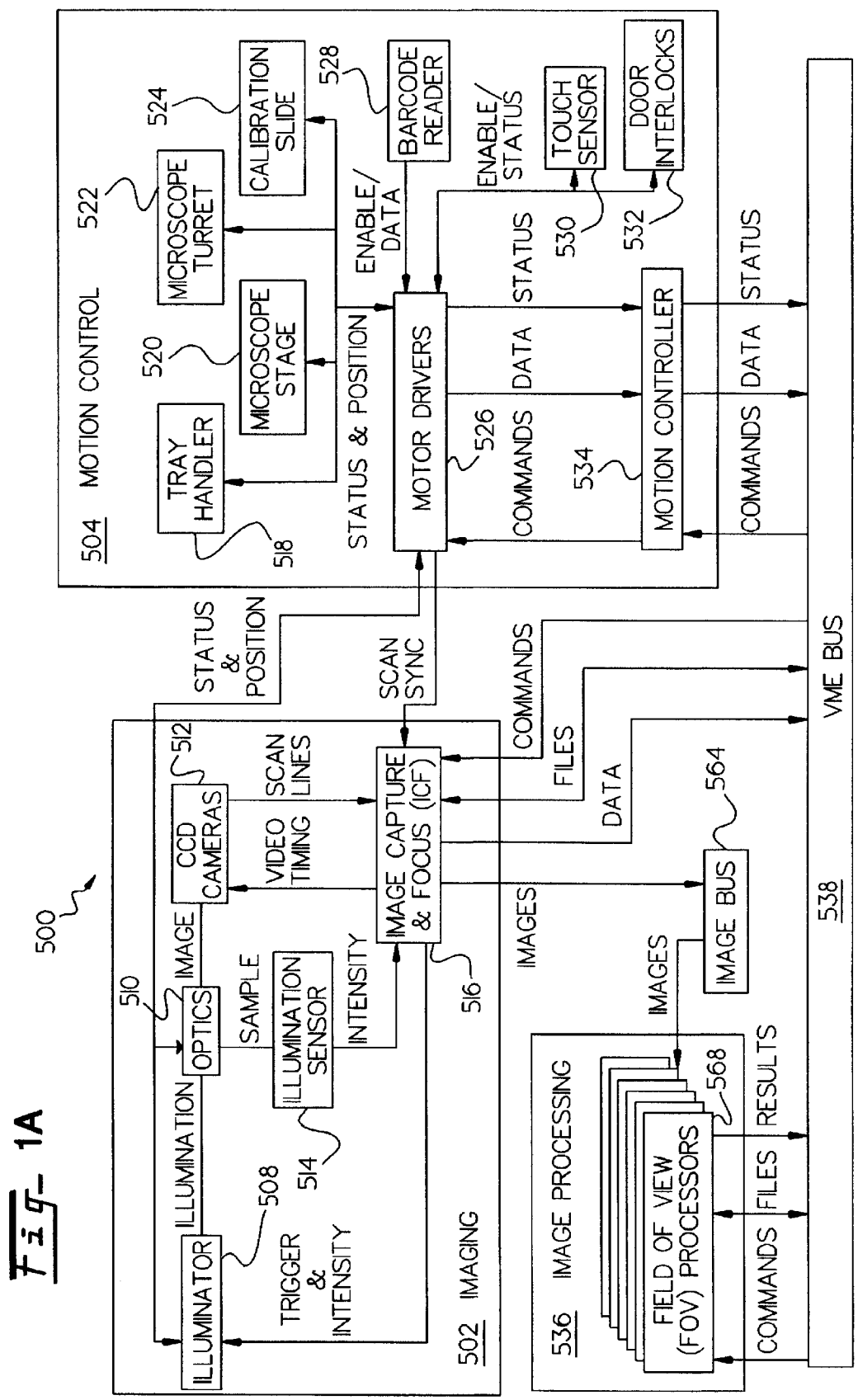
FIGS. 1A, 1B and 1C show one embodiment of an interactive biological specimen classification system of the invention.

This invention discloses a slide sorting method and apparatus comprising fully automated processing and interactive review components. A biological specimen such as a Papanicolaou-stained smear, commonly referred to as a pap smear, may be loaded into a slide processing system. In one embodiment of the invention, the apparatus processes the slides and sorts them into normal or human review categories. In a fully automated mode, a slide is analyzed and an analysis score is generated. In one preferred embodiment of the invention, an analysis score is generated by the method disclosed in U.S. Pat. No. 5,787,188 entitled "Method for Identifying Normal Biological Specimens," as discussed herein.

In a presently preferred embodiment of the invention, the system disclosed herein is used in a system for analyzing cervical pap smears, such as that shown and disclosed in U.S. Pat. No. 5,787,188, issued Jul. 28, 1998 to Nelson et al., entitled "Method For Identifying Normal Biomedical Specimens," which is a file wrapper continuation of abandoned application Ser. No. 07/838,064, filed Feb. 18, 1992; U.S. Pat. No. 5,528,703, issued Jun. 18, 1996 to Lee, entitled "Method For Identifying Objects Using Data Processing Techniques," which is a file wrapper continuation of abandoned U.S. patent application Ser. No. 07/838,395, filed Feb. 18, 1992; U.S. Pat. No. 5,315,700, issued May 24, 1994 to Johnston et al., entitled "Method And Apparatus For Rapidly Processing Data Sequences;" U.S. Pat. No. 5,361,140, issued Nov. 1, 1994 to Hayenga et al., entitled "Method and Apparatus for Dynamic Correction of Microscopic Image Signals;" and U.S. Pat. No. 5,912,699, issued Jul. 15, 1999 to Hayenga et al., entitled "Method and Apparatus for Rapid Capture of Focused Microscopic Images," which is a continuation-in-part of abandoned U.S. patent application Ser. No. 07/838,063 filed on Feb. 18, 1992 the disclosures of which are incorporated herein, in their entirety, by the foregoing references thereto.

The present invention is also related to biological and cytological systems as described in the following patent applications which are assigned to the same assignee as the present invention, and which are all hereby incorporated by reference including U.S. Pat. No. 5,757,954, issued May 26, 1998 to Kuan et al., entitled, "Field Prioritization Apparatus and Method;" pending U.S. patent application Ser. No. 08/927,379, filed Sep. 12, 1997, to Wilhelm et al., entitled "Apparatus for Automated Identification of Cell Groupings on a Biological Specimen," which is a file wrapper continuation of abandoned U.S. patent application Ser. No. 08/309,061, filed Sep. 20, 1994; pending U.S. patent application Ser. No. 08/969,970, filed Nov. 13, 1997, to Meyer et al., entitled "Apparatus for Automated Identification of Thick Cell Groupings on a Biological Specimen," which is a file wrapper continuation of abandoned U.S. patent application Ser. No. 08/309,116, filed Sep. 20, 1994; U.S. Pat. No. 5,787,189, issued Jul. 28, 1998 to Lee et al., entitled "Biological Analysis System Self Calibration Apparatus," which is a file wrapper continuation of abandoned U.S. patent application Ser. No. 08/309,115, filed Sep. 20, 1994; U.S. Pat. No. 5,828,776, issued Oct. 27, 1998, to Lee et al., entitled "Apparatus for Identification and Integration of Multiple Cell Patterns," which is a file wrapper continuation of abandoned U.S. patent application Ser. No. 08/308,992, filed Sep. 20, 1994; U.S. Pat. No. 5,627,908, issued May. 6, 1997 to Lee et al., entitled "Method for Cytological System Dynamic Normalization;" U.S. Pat. No. 5,638,459, issued Jun. 10, 1997 to Rosenlof et al., entitled "Method and Apparatus for Detecting a Microscope Slide Coverslip;" U.S. Pat. No. 5,566,249, issued Oct. 15, 1996, to Rosenlof et al. entitled "Apparatus for Detecting Bubbles in Coverslip Adhesive," U.S. Pat. No. 5,933,519, issued Aug. 3, 1999, to Lee et al., entitled "Cytological Slide Scoring Apparatus," which is a file wrapper continuation of abandoned U.S. patent application Ser. No. 08/309,931, filed Sep. 20, 1994; U.S. Pat. No. 5,692,066, issued Nov. 25, 1997, to Lee et al., entitled "Method and Apparatus for Image Plane Modulation Pattern Recognition;" allowed U.S. patent application Ser. No. 08/309,250, filed Sep. 20, 1994, for which the issue fee has been paid, to Lee et al. entitled "Apparatus for the Identification of Free-Lying Cells," U.S. Pat. No. 5,715,327, issued Feb. 3, 1998 to Wilhelm et al., entitled "Method and Apparatus for Detection of Unsuitable Conditions for Automated Cytology Scoring."

Figure 1B:
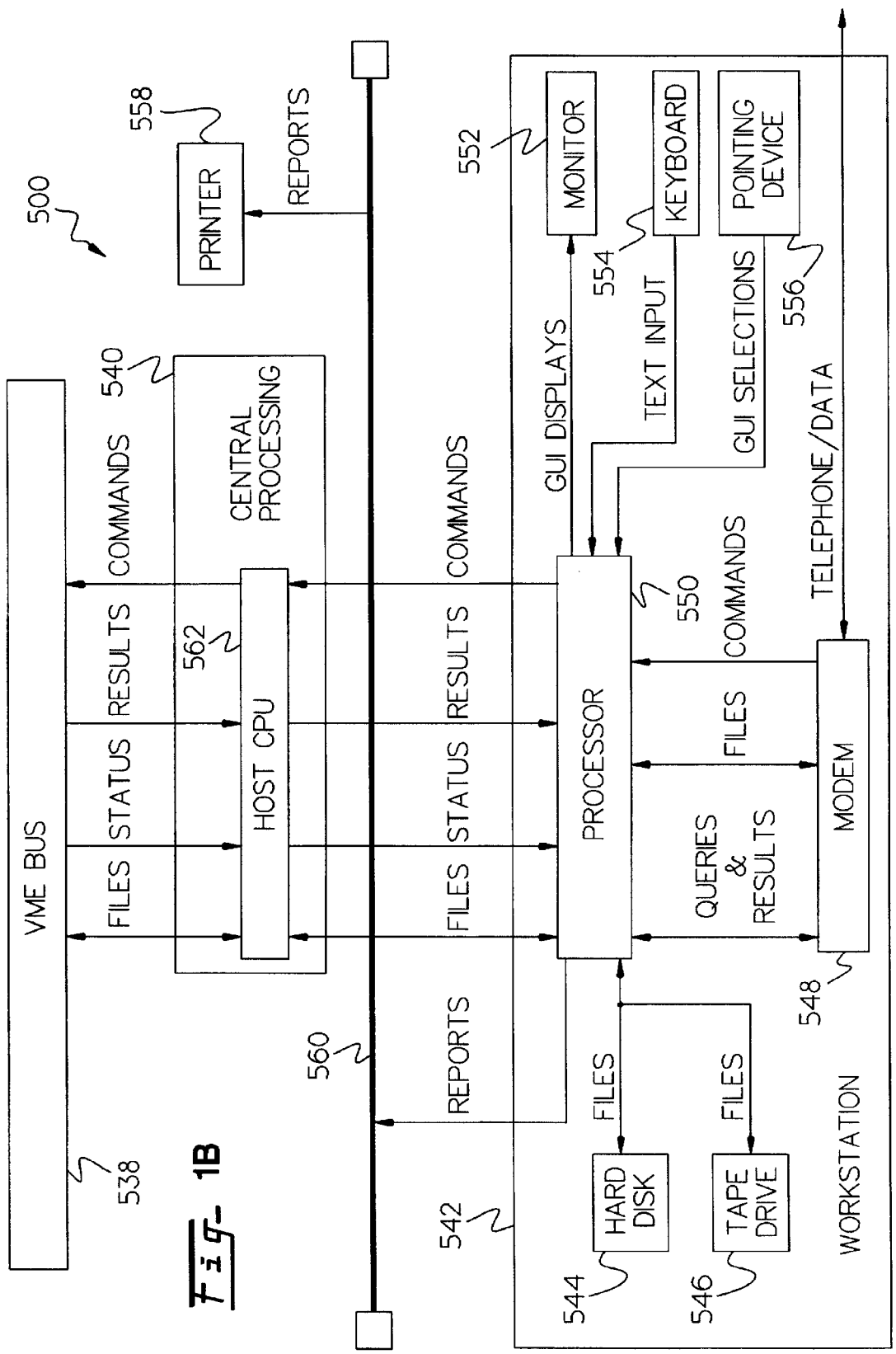
Figure 1C:
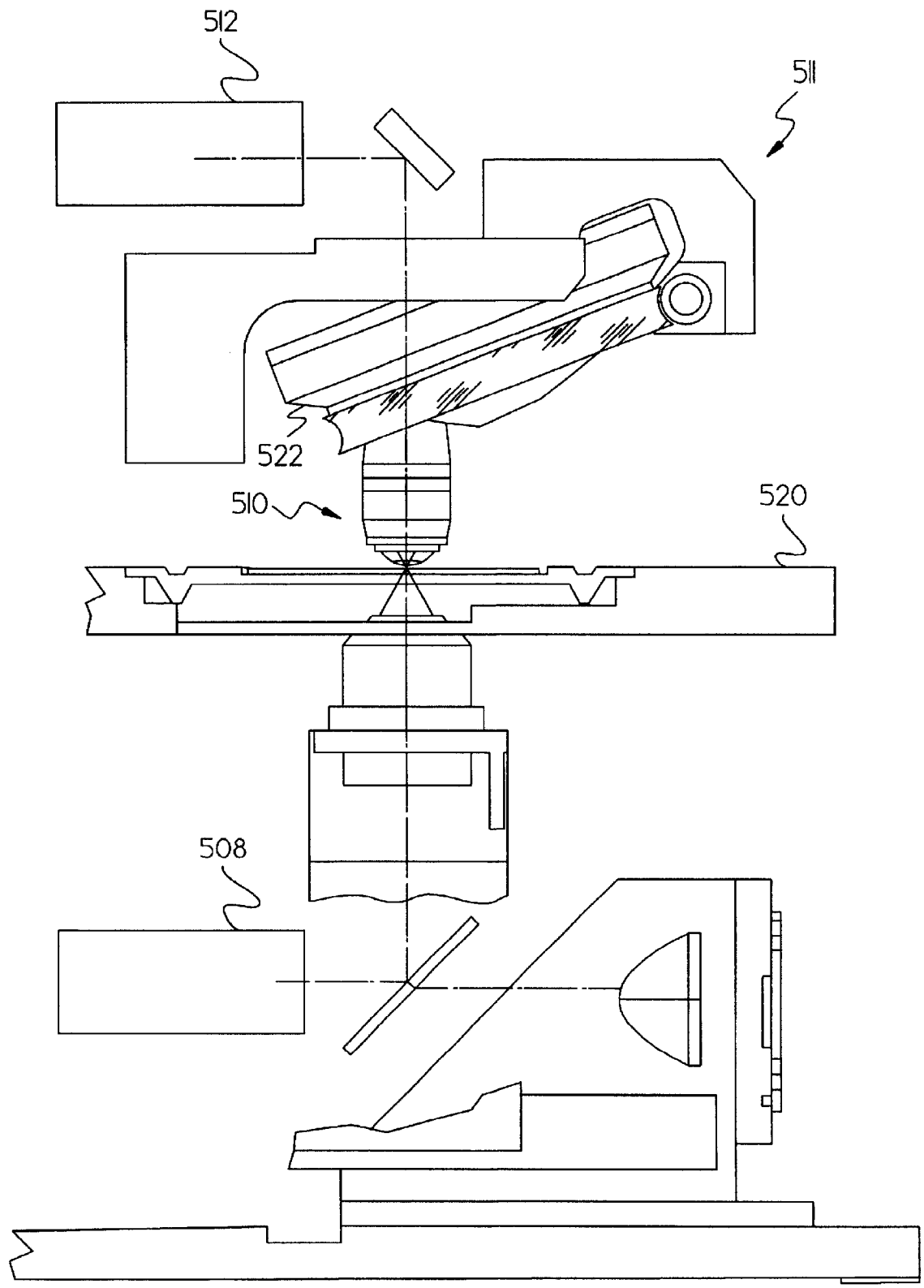

Now refer to FIGS. 1A, 1B and 1C which show a schematic diagram of one embodiment of the apparatus of the invention for robust biological specimen classification 500. The apparatus of the invention comprises an imaging system 502, a motion control system 504, an image processing system 536, a central processing system 540, and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In some embodiments optics 510 may comprise color filters. In one embodiment of the invention, the optics may further comprise an automated microscope 511. The illuminator 508 provides illumination of a slide. The image capture and focus system 516 provides data to a VME bus 538. The VME bus distributes the data to an image processing system 536. The image processing system 536 is comprised of field-of-view processors 568. The images are sent along the image bus 564 from the image capture and focus system 516. A central processor 540 controls the operation of the invention through the VME bus 538. In one embodiment the central processor 562 comprises a MOTOROLA 68030 CPU. The motion controller 504 is comprised of a tray handler 518, a microscope stage controller 520, a microscope tray controller 522, and a calibration slide 524. The motor drivers 526 position the slide under the optics. A bar code reader 528 reads a barcode located on the slide 524. A touch sensor 530 determines whether a slide is under the microscope objectives, and a door interlock 532 prevents operation in case the doors are open. Motion controller 534 controls the motor drivers 526 in response to the central processor 540. An Ethernet communication system 560 communicates to a workstation 542 to provide control of the system. A hard disk 544 is controlled by workstation 550. In one embodiment, workstation 550 may comprise a sum SPARC Classic (TM) workstation. A tape drive 546 is connected to the workstation 550 as well as a modem 548, a monitor 552, a keyboard 554, and a mouse pointing device 556. A printer 558 is connected to the ethernet 560.

During slide classification, the central computer 540, running a real time operating system, controls the microscope 511 and the processor to acquire and digitize images from the microscope 511. The flatness of the slide may be checked, for example, by contacting the four corners of the slide using a computer controlled touch sensor. The computer 540 also controls the microscope 511 stage to position the specimen under the microscope objective, and from one to fifteen field of view (FOV) processors 568 which receive images under control of the computer 540.

It is to be understood that the various processes described herein may be implemented in software suitable for running on a digital processor. The software may be embedded, for example, in the central processor 540.

Figure 2:
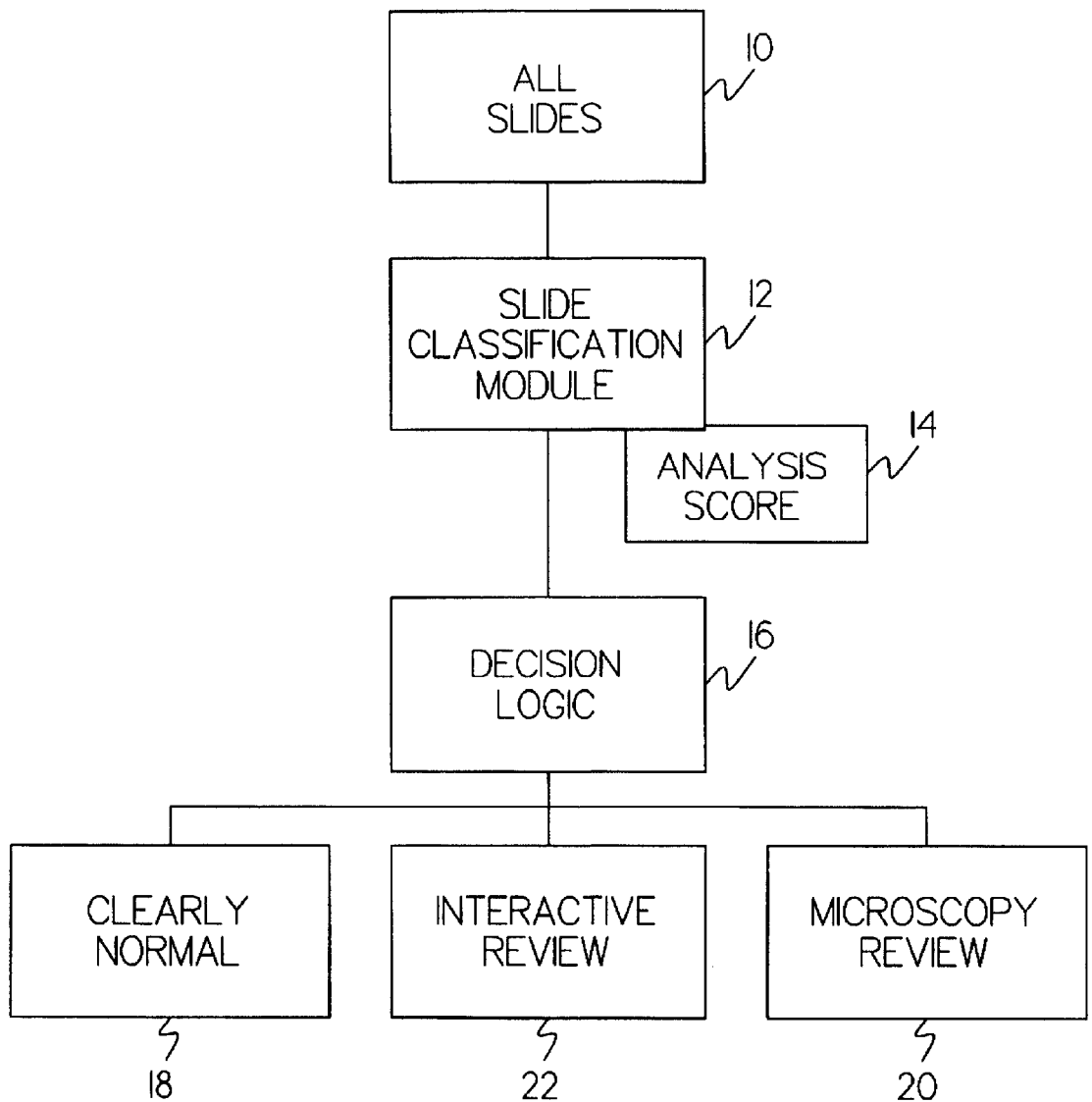
FIG. 2 is a diagram illustrating generally one method of the subject invention used for identifying biological specimens.

Now refer to FIG. 2 which generally shows one example of the slide classification architecture of the invention. The method and apparatus of the invention classifies biological specimens based on a distributed processing and information integration methodology. A biological specimen, such as a pap smear, is loaded into a slide classification module 12 advantageously implemented in classification apparatus 500. The system processes the slides and generates an analysis score 14. The slides 10 are sorted in decision logic 16 into normal 18, microscopy review 20 or interactive review 22 categories based on the analysis score 14 as compared to case decision boundaries. The decision logic is:

IF analysis score<normal threshold THEN clearly normal,
ELSE IF analysis score>review threshold THEN microscopy review,
ELSE interactive review.

Figure 3:
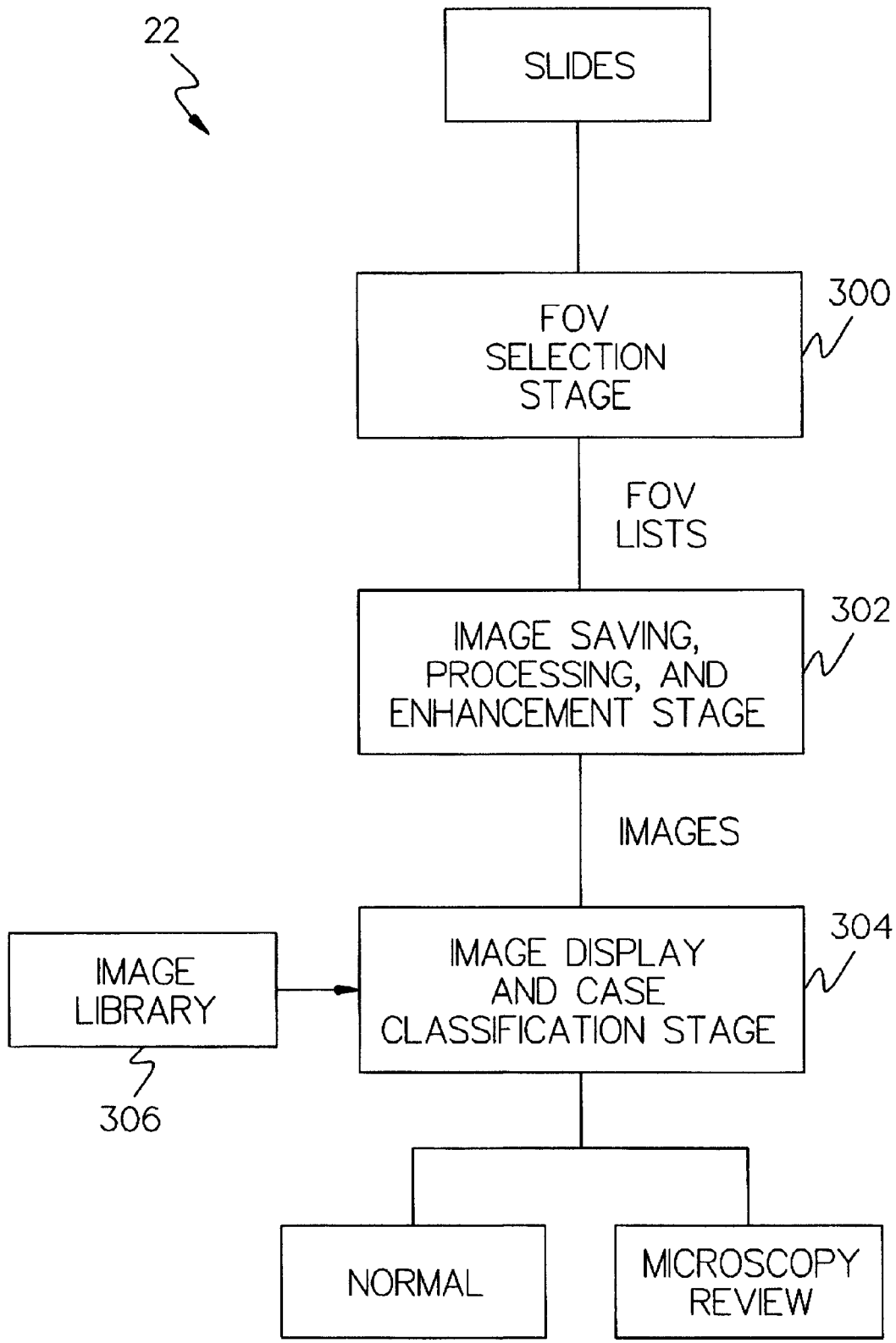
FIG. 3 is a method flow diagram illustrating processing stages of an interactive review method in accordance with the invention.

Now referring to FIG. 3, a method flow diagram illustrating processing stages of an interactive review method is shown. The interactive review method includes a plurality of processing stages comprising a field-of-view (FOV) selection stage 300, an image saving, processing and enhancement stage 302, and an image display and case classification stage 304. The field-of-view selection stage 300 selects the fields-of-view of interest for review. The image saving, processing, and enhancement stage 302 acquires and prepares the fields-of-view of interest for human review. The image display and case classification stage 304 displays the fields-of-view of interest and images in image library 306 to a human reader, such as a cytotechnologist and classifies the slide based on a combination of computer internal scores and human review results. The detailed functions of each stage are described in the following sections.

Figure 4:
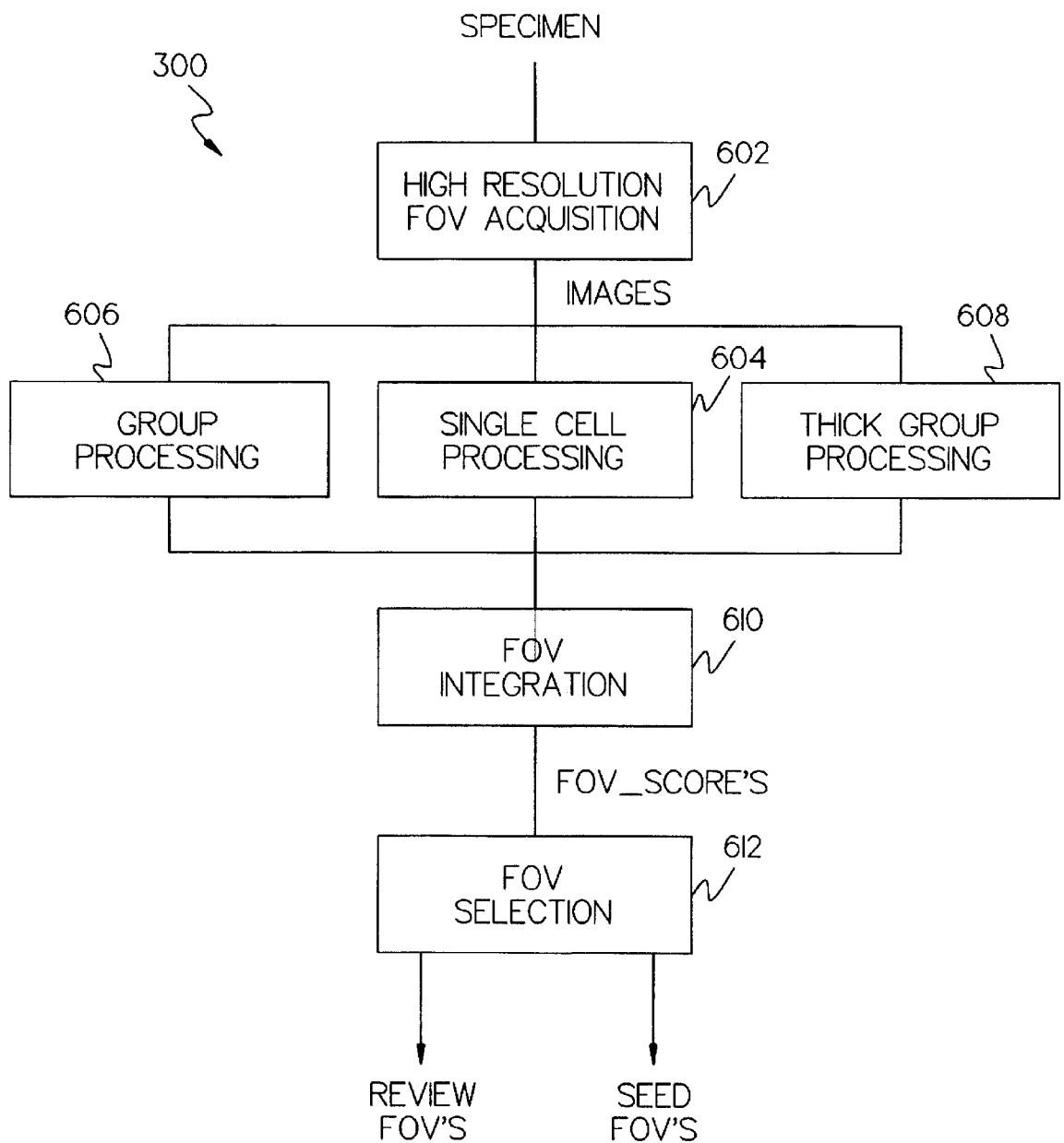
FIG. 4 is a method flow diagram illustrating steps for the processing flow of a field-of-view selection stage as employed in one embodiment of the invention.

Now referring to FIG. 4, a method flow diagram illustrating steps for the processing flow of the field-of-view selection stage 300 is shown. The image processing system 536 acquires approximately 1,000 high resolution image Fields-Of-View (FOVs) from a specimen at process step 602. Each field-of-view is processed using three processing methods, including a single cell detection process 604, a cell group detection process 606, and a thick cell group detection process 608 such as are disclosed, for example, in the above-referenced patent applications.

The single cell detection process 604 detects and classifies a majority of free-lying objects in an image field-of-view. In one example, potential pre-malignant or malignant cells are identified and assigned a confidence value for each detected object. The confidence value ranges from "0" to "1" where "0" denotes objects which most likely are clearly normal cells and "1" denotes objects which are most likely true malignant cells. Objects having confidence values higher than an alarm threshold in the range between "0" and "1" are called alarmed objects.

An object classification and confidence value is assigned based on the method disclosed hereinabove for identifying normal biomedical specimens. In a conventionally prepared Papanicolaou smear, the number of detected single cells in a high resolution field-of-view (for example, using a 20X objective lens) varies significantly. The range may vary from 1 to 200.

As part of the single cell detection process 604, an intermediate squamous cell classification algorithm is applied to the objects having low confidence of malignancy. The algorithm detects the normal cells which most likely are intermediate cells. Intermediate cells are clearly normal cells which are normally used by cytotechnologists as reference cells during cell classifications.

The group detection process 606 detects and classifies groups of cells formed in sheet or syncytium arrangements. Such groups are discussed in an article by Stanley Patten Jr., entitled "Monographs in Clinical Cytology," S. Karger AG, 1978. A sheet of cells is a grouping in which the component cells are regularly arranged in relation to one another and possess distinct cell boundaries. A syncytium is a group of cells which are irregularly arranged with respect to one another and have indistinct cell boundaries. The detected cell groups are classified as polymorphonuclear leukocytes, squamous cell groups, endocervical and metaplastic cell groups, or abnormal cell groups. As disease progresses, pre-malignant or malignant cells begin to form as groups of cells.

The cells have rather irregular formations and often have a great deal of variations in size and shape between cells according to the severity of the disease. Polymorphonuclear leukocytes are white blood cells often associated with benign inflammatory conditions. Squamous cell groups are a group of benign squamous cells, with rather uniform cell formations. Endocervical and metaplastic cell groups are cells sampled from the transformation zone of the cervical canal. The normal cell groups have a much more uniform structure and fewer cell to cell variations compared to abnormal ones. Cells from normal cell groups can be mistaken for premalignant or malignant cells when examined an individual cell at a time without contextual information. However, when contextual information is included in the evaluation, diagnosis accuracy may be significantly improved.

The thick group detection process 608 detects and classifies thick groups of cells formed as three-dimensional clusters of cells. A cell cluster is a more or less three-dimensional grouping of cells with altered polarity and usually poorly-defined cell boundaries. The detected thick groups are classified as normal cell clusters, endometrial cell clusters, or abnormal cell clusters. Cervical cancer of glandular origin such as adenocarcinoma tends to form as three dimensional clusters of cells.

A contextual dependent strategy is used to classify and rank the image fields-of-view. Rather than rank each cell, the method of the present invention ranks each processed field-of-view. When ranking each field-of-view, all detected single cells, groups, and thick group objects are included in the ranking decision. A field-of-view having more than one detected high confidence abnormal single object will generate more than one alarm and will be ranked higher than a field-of-view having only one alarm. Similarly, a field-of-view having both an alarm and an abnormal group will yield a higher rank. Conversely, a field-of-view having an alarm and a detected endocervical or metaplastic group will be ranked lower since the single alarmed object may be a false positive of a normal metaplastic cell. In this way, the alarms plus the detection of group and thick group objects are used as features to assign a rank to the field-of-view. By this procedure, all information in a field-of-view is used to determine the selection of the field-of-view for display. When displaying the image, the whole field-of-view is shown. Such a display overcomes the object-based selection approach which may not select proper objects having sufficient context to yield a decisive review result.

In a preferred embodiment of the implementation, the field-of-view integration process 610 may advantageously be implemented according to the following relationships.

Field-of-view score=Single cell score+Group score+Thick group score

Single cell score=Single cell sum*Single cell correction

Single cell sum=Sum over the confidences of the detected single cell alarms

Single cell correction=1.+0.1*(number of group abnormal)−0.1*(number of group normal)+0.1*(number of thick group abnormal)−0.1*(number of thick group normal)

Group sum=Sum over the confidences of the detected abnormal groups

Thick group sum=Sum over the confidences of the detected abnormal thick groups

Group score=group sum

Thick group score=Thick group sum

The fields-of-view are ranked based on the field-of-view score. The number of fields-of-view to be displayed is determined dynamically for each slide. Only fields-of-view having high enough field-of-view scores will be selected for display. This is accomplished by two limits, a first limit comprising a maximum allowable number of fields-of-view and a second limit comprising a minimum allowable field-of-view score. The field-of-view selection procedure 612 may comprise at least the following two steps.

Step (1) The fields-of-view having field-of-view scores greater than or equal to a minimum allowable field-of-view score are selected. If the total number of selected fields-of-view is less than or equal to the maximum allowable number of fields-of-view then all selected fields-of-view will be included and the process is stopped. Otherwise, the procedure goes to step (2).

Step (2) The selected fields-of-view selected in step (1) are ranked using the field-of-view score. The top maximum allowable number of fields-of-view are then selected for review.

In addition, a set of fields-of-view highly suggestive of the presence of abnormal cells will invoke the examination of the adjacent fields-of-view which have not been acquired for processing at high resolution. These fields-of-view are called seed fields-of-view and may be determined by the following relationships as expressed in pseudo-code.
IF field-of-view score>seed threshold THEN select as a seed field-of-view,
ELSE not select,
where the "seed threshold" parameter is a pre-determined system parameter.

If seed fields-of-view exist, the system first determines the fields-of-view adjacent to the seed fields-of-view which have not been processed at the high magnification. The system acquires and processes these fields-of-view. The additional fields-of-view will be evaluated and ranked for possible inclusion in the review field-of-view list. Next, field-of-view scores will be computed and the review field-of-view selection process takes place again. This process continues until there are no more changes in the review field-of-view list.

In the image saving mode, the system acquires the images corresponding to the selected fields-of-view. In this acquisition, multiple images each from a different focal plane are acquired for each field-of-view. The images include the best focused image and some number of images above and some number of images below the best focal plane as discussed in U.S. Pat. No. 5,912,699, ibid. In one example embodiment of the invention, a regular step size is used to acquire the images for multiple focal planes.

The number of images above and below the best focused image may be dynamically determined from an image content measurement. Image content is defined as the average gray scale value of an image subject to a band pass filter operation. The best focused image has the highest image content measure and images from other focal planes should have progressively lower image content measures as the distance between the focal planes and the best focus plane increases. A predetermined minimum image content ratio (MICR) is used to govern the multiple focal plane image acquisition process. The image acquisition procedure comprises the following steps wherein the imaging apparatus 502 is employed to acquire the best focused image.

Step 1. Acquire the best focused image and determine its image content $IC\_0$.

Step 2. Move a fixed step above the current focus position, acquire an image and measure its image content $IC\_i$. Determine the image content ratio $IC\_i/IC\_0$. If the ratio is less than MICR then go to step 3. Otherwise continue step 2 to acquire more images.

Step 3. Move back to the best focus position.

Step 4. Move a fixed step below the current focus position, acquire an image and measure its image content $IC\_j$. Determine the image content ratio $IC\_j/IC\_0$. If the ratio is less than MICR then stop. Otherwise continue the step 4 to acquire more images.

Since only minor differences exist in the images acquired from each consecutive focal plane pair, an efficient image compression method may be applied. In one embodiment, the image compression method saves the most in-focus image first and then saves only the difference between each consecutive image pair. All the saved images are then compressed by a standard lossless image compression method such as well-known Run-length encoding, Huffman coding, or equivalent known encoding techniques. Since the contents of the difference images are minimal, a high image compression ratio may be achieved. Alternatively, all the saved images may be compressed by a standard lossy image compression method or equivalent known encoding techniques.

The multiple focal plane images acquired may be used in three ways: (1) image enhancement by optical sectioning, (2) image depth-of-focus expansion, and (3) support for adjustable focus during image display.

Image enhancement by optical sectioning

Papanicolaou smear fields-of-view often exhibit cells formed in three dimensional structures. Each image acquired in a focal plane represents the sum of in-focus information from the focal plane and out-of-focus information from the remainder of the specimen. Much of the out-of-focus information can be removed computationally by an optical sectioning technique as described in Agard, "Optical Sectioning Microscopy: Cellular Architecture in Three Dimensions," Annual Review Biophys. Bioeng. 1984. 13:191–219. The optical sectioning technique allows the complex cell structure of each plane to be clearly presented and examined by a human reviewer.

One procedure used to perform optical sectioning comprises the following steps:

Step 1. When determining an enhanced image $I\_j$ for image plane j, the observed image at j, $O\_j$, and the observed images above the plane, $O\_(j-1)$, and the image below the plane, $O\_(j+1)$, are used to perform the operation. The operation is defined in the following relationship as:

$$I\_j = C2 \, (O\_j - C1 \, \text{MAX}(S*O\_(j-1), S*O\_(j+1))$$

where MAX(x,y) comprises a point-by-point maximum of the pixel values of the images x and y. S is a well known contrast transfer function as defined in Agard, Id., and Hopkins, H. H., Proc. R. Soc. London A231:91–103, 1955.

Image depth of focus expansion

To improve the efficiency of human examination, it is possible to construct a single image with an extended depth-of-field by combining the most in-focus portions of the field-of-view from images acquired from different focal planes The procedure of combination can be done in a multiresolution decomposition and synthesis approach as described in Kelm, Hwang, and Lee, "Image Enhancement via Multiresolution Decomposition and Synthesis," in an extended paper summary for the International Conference on Acoustic System Signal Processing, 1992.

Figure 5:
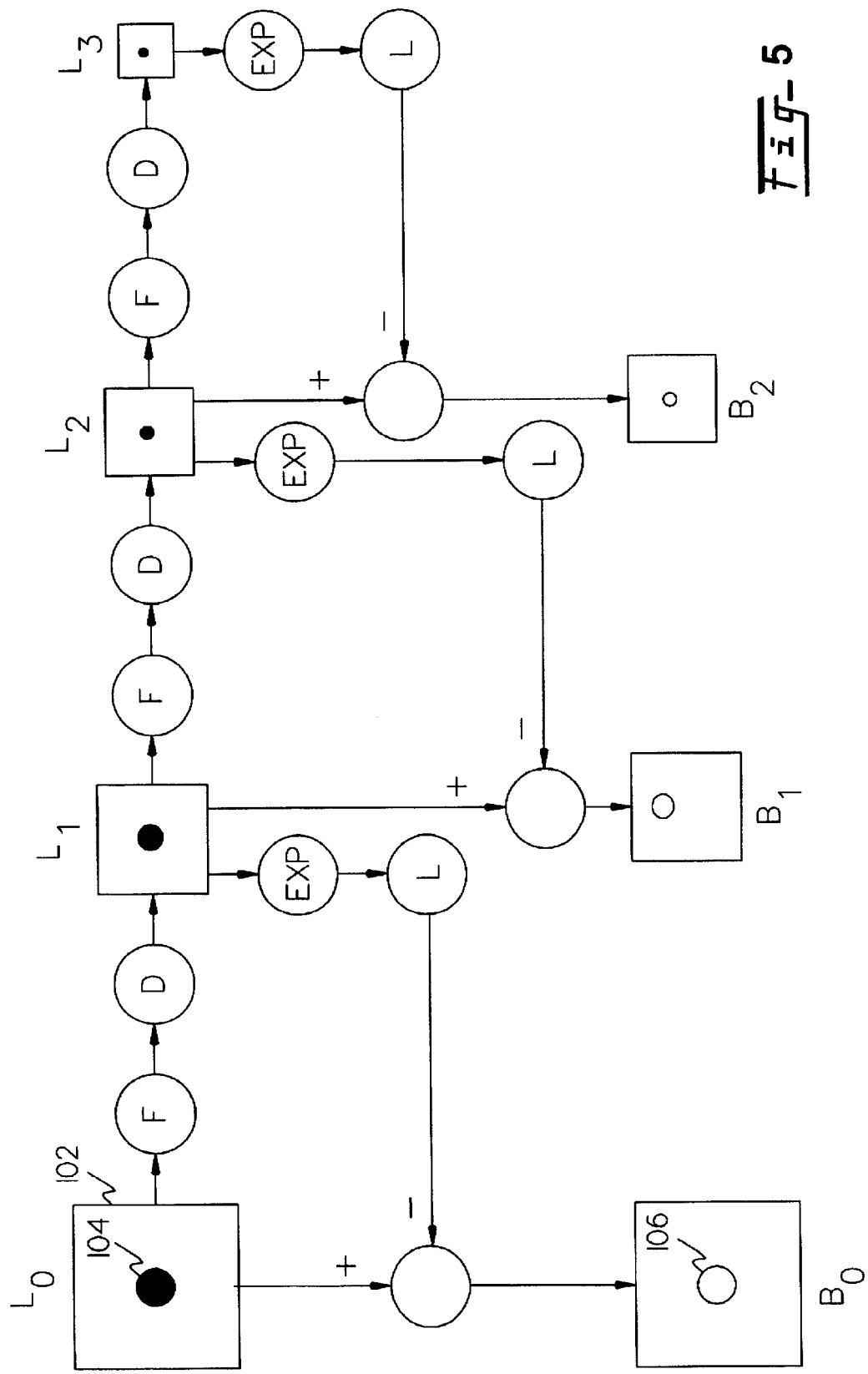
FIG. 5 is a flow diagram schematically illustrating construction procedures of low pass and band pass decompositions used in one embodiment of the subject invention.

Referring now to FIG. 5, where a flow diagram schematically illustrates construction procedures of low pass and band pass decompositions as employed in one embodiment of the invention. The image decompositions are data structures designed to isolate image features at different scales and to support efficient scaled neighborhood operations through reduced image representation. It includes a low pass decomposition and a band pass decomposition. The low pass decomposition comprises a sequence of copies of the original image in which both sample density and resolution are decreased in regular or irregular steps. These reduced resolution levels of the decomposition are themselves obtained through a highly efficient iterative algorithm. The bottom, or zero$^{th}$ level of the low pass decomposition, $L_0$, is equal to the original image. Low pass decomposition operates on a cell 104 with field-of-view 102. This image is linearly or morphologically low pass filtered and down-sampled, usually by a factor of two in each dimension, to obtain the next decomposition level, $L_1$. $L_1$ is then filtered in the same way and down-sampled to obtain $L_2$. Further repetitions of the filter/down-sample steps generate the remaining low pass decomposition levels. Thus, $$L_0=I;$$

$$L_i=D(F(L_{i-1})), i>=1,$$

where F(.) is a low pass filter operation and D(.) is a down-sample operation. The low pass filter can be a linear convolution filter or a nonlinear, morphological filter such as a dilation, erosion, opening, closing, etc. See, for example, Serra, J, "Image analysis and mathematical morphology," London: Academic, 1982; Sternberg, SR, "Gray-scale morphology," Computer Graphics Image Processing, vol. 35: 333–355, 1986; and Lee, JSJ, Haralick, RM and Shapiro, LG, "Morphologic Edge Detection," IEEE Transaction Robotics and Automation RA3(2):142–56, 1987.

In one preferred embodiment of the method of the invention, the down-sample operation simply skips every other pixel and every other line of the image. The low pass decomposition is equivalent to filtering the original image with a set of equivalent linear or nonlinear neighborhood functions. The equivalent functions increase in width with each level that is in proportion to the down-sample factor. In the case where the function F(.) is a linear Gaussian convolution with a five point kernel and a down-sample ratio of two in each dimension, the equivalent filters act as low pass filters with the band limit reduced correspondingly by one octave with each level. The linear low pass decomposition using Gaussian convolution is equivalent to the well known Gaussian pyramid data structure. See, for example, Burt, PJ, "Fast filter transforms for image processing," Computer Graphics and Image Processing, 16: 20–51, 1981; Burt, PJ and Adelson, E, "The Laplacian pyramid as a compact image code," IEEE Transaction on Communication, COM-31: 532–540, 1983.

The band pass decomposition may be generated by subtracting each low pass decomposition level from the next lower level in the decomposition. In FIG. 5, a band pass operation is done on cell edge information 106. Because these levels differ in their sample density, it is necessary to interpolate new sample values between those in a given level before that level is subtracted from the next lower level. The interpolation can be achieved by point replication followed by linear low pass filtering. The levels of the band pass decomposition, $B_i$, can thus be specified in terms of the low pass decomposition levels as follows:

$$B_i=L_i-L(EXP(L_{i+1})),$$

where L(.) is a multidimensional linear low pass filter and EXP(.) is a multidimensional data replication.

Figure 6:
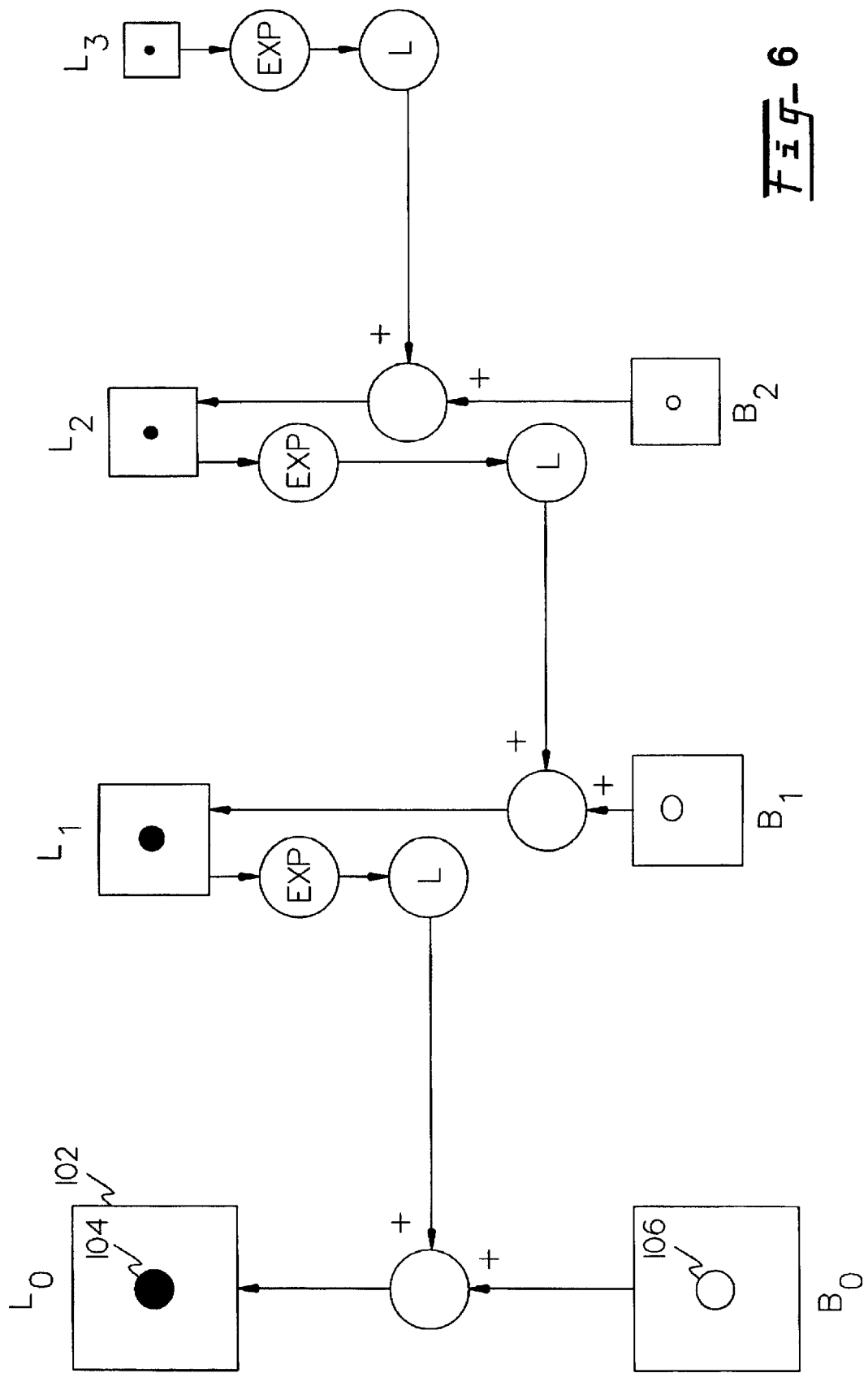
FIG. 6 is a block diagram schematically illustrating a coarse to fine synthesis process as employed in one embodiment of the invention.

Now refer to FIG. 6 where a block diagram illustrating a coarse to fine synthesis process for $L_i$'s is shown. Given an image, the band pass decomposition decomposes the image into different bands in spatial frequency or morphological pattern scale. The linear band pass images, as with the Fourier transform, represent pattern components that are restricted in the spatial-frequency domain. But unlike the Fourier transform, the images are also restricted to local volumes in the spatial domain. Spatial, as well as spatial-frequency localization, can be critical in the analysis of images that contain multiple objects so that the characteristics of single objects are extracted rather than compound the characteristics of many objects. In this way, individual samples of a component image represent image pattern information that is appropriately localized, while the band passed image as a whole represents information about a particular fineness of detail or scale.

An important property of the band pass decomposition is that it is a complete image representation. That is to say, the step used to construct the decomposition may be reversed to synthesize the original image exactly. To recover $L_i$, the low pass decomposition level $L_{i+1}$ is interpolated and added to $B_i$. This procedure can be repeated to recover $L_{i-1}$. $L_{i-2}$, and so on until the original image is recovered. Thus, $$L_i=B_i+L(EXP(L_{i+1})) \text{ for all, i.e. } \{1, \ldots, N-1\}, \text{ and } I=L_0=B_0+L(EXP(L_1)).$$

In the image depth-of-focus expansion procedure, the image from each focal plane is first decomposed into linear basis functions through the band pass decomposition. An image synthesis process is then applied to construct the focus expanded image. In the process, each band pass level is selected from the multiple focal plane representations corresponding to image decompositions of this level which represents image information that is most in-focus. The determination of the degree of focus is simple. When a pattern is moved out of focus, it loses energy first in its high spatial frequencies and then in progressively lower spatial frequency components. This is manifested as a loss of contrast in the corresponding spatial frequency bands. In the decomposition, loss of focus results in reduced amplitude of the individual band pixel values. In a simple implementation, for a given composite decomposition level, the corresponding source decomposition level that is most in-focus may be identified as that which has the highest absolute value. The final composite is obtained simply through the coarse-to-fine synthesis process of each selected level.

Figure 7:
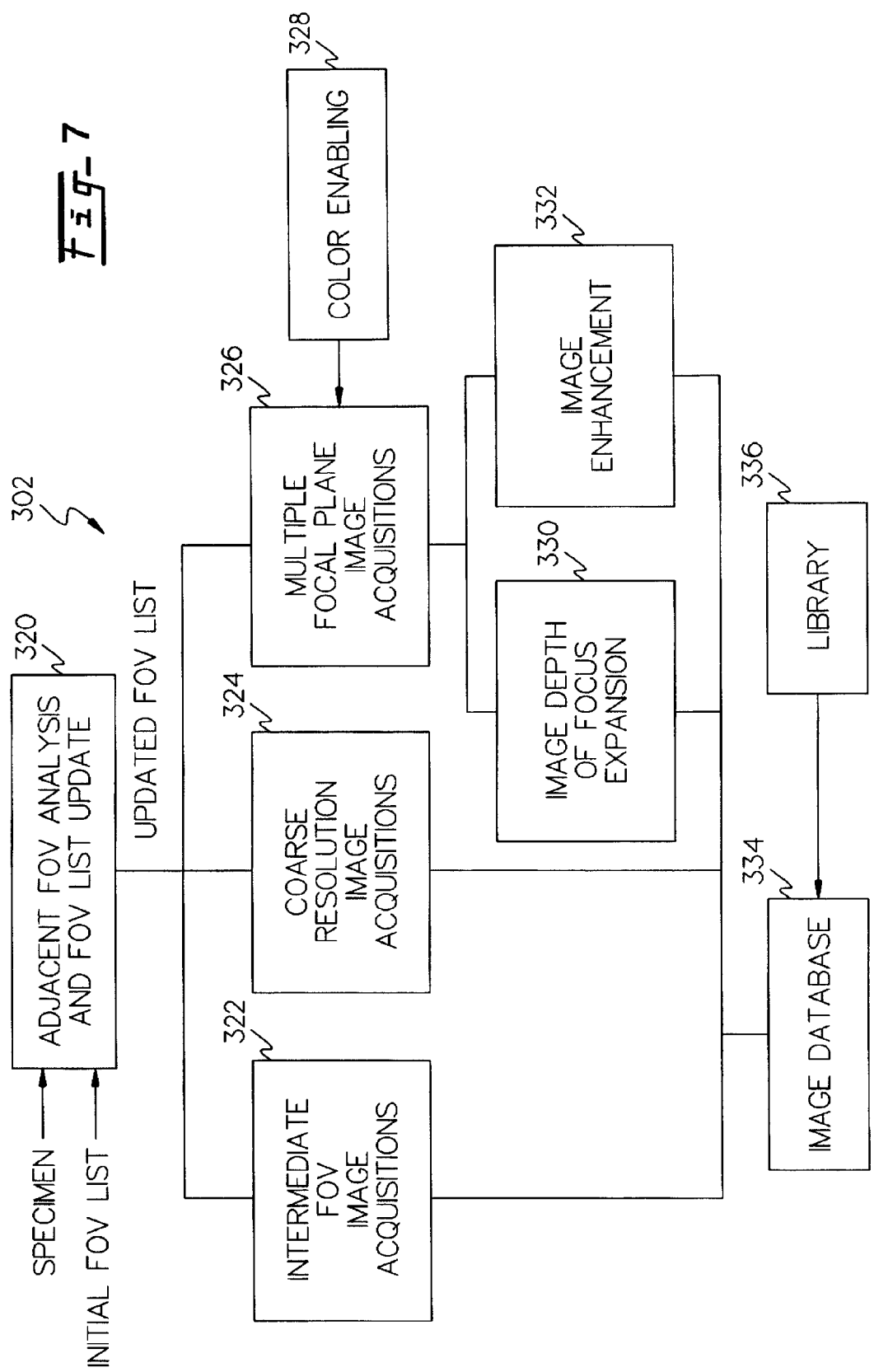
FIG. 7 is a method flow diagram illustrating steps used to save, process and enhance an image in accordance with the subject invention.

Now referring to FIG. 7 which shows the processing flow of the image saving, processing and enhancement stage 302. The image saving, processing and enhancement stage 302 comprises a plurality of functions including a function for adjacent FOV analysis and FOV list update function 320, intermediate FOV image acquisition function 322, coarse resolution image acquisition function 324, multiple focal plane image acquisition function 326, an optional color enabling function 328, image depth of focus image expansion function 330 and image enhancement function 332. An image data base 334, which may comprise a conventional computer memory, for example, receives data from the intermediate FOV image acquisition function 322, a coarse resolution image acquisition function 324, the image depth of focus expansion function 330 and the image enhancement function 332. The library 336 may also be accessed by the image data base 334. The specimen and an initial FOV list generated without benefit of the adjacent FOV analysis are input into adjacent FOV analysis and FOV list update function 320. An updated FOV list including analysis of adjacent FOVs as described herein above is generated and provided to each of the intermediate FOV image acquisition function 322, a coarse resolution image acquisition function 324 and the multiple focal plane image acquisition image function 326. Optional color enabling function 328 may be included in the process if color filtering has been introduced into the optics. Intermediate FOV image acquisitions are provided to the image data base as are coarse resolution image acquisitions. The multiple focal plane image acquisitions, as described above, are further processed through an image depth of focus expansion step 330 and image enhancement function 332.

In addition, for each selected field-of-view, a best-focused image may be acquired at a coarse resolution. In a preferred embodiment of the invention, the coarse image will be at half the resolution of the high resolution image. Only the best focused image will be acquired at the coarse resolution. The coarse resolution image will be used to provide contextual information for human reviewer.

To make sure that representative normal, intermediate squamous cell fields-of-view are available for comparative evaluation during human review, the detected intermediate cell fields-of-view will also be acquired at high resolution. Only the best-focused image will be acquired for these fields-of-view.

In addition to the gray scale images, multiple color filters may advantageously be used to acquire color images for display. In a preferred embodiment of the invention, gray scale images are acquired at a primary wavelength, $l_0$, as, for example, 528 nanometers. Two or more additional images may be taken of the best focused image at alternate wavelengths, $l_i$. Images may advantageously be acquired with narrow band filters at 485 nanometers for $l_1$ and 569 nanometers for $l_2$ as defined by Aggarwal and Bacus, in their article entitled "A Multi-spectral Approach for Scene Analysis of Cervical Cytology Smears." Journal of Histochemistry and Cytochemistry, 1977, 25:668–680. These filters may be mechanically inserted in the illumination path, as part of optics 510, for example. Images taken in these and other alternate wavelengths are known to be important cytological differentiators of features such as cell walls, cytoplasmic content, nuclear composition and nucleoids.

In a preferred embodiment of the implementation, offset and gain adjustments for the capturing of images are computed on a pixel-by-pixel basis for each wavelength in order to normalize acquired images over a 0 to 255 quantization range as, for example, according to a method disclosed in U.S. Pat. No. 5,361,140, ibid.

In addition, in this invention, a library 336 of images corresponding to representative cell types from Papanicolaou smears from both normal and abnormal cases may be acquired and pre-stored for selective display during human review. The image library will be available for comparative review to assist human review decisions. Overlay images may advantageously be provided for the library images to show the cells of interest and diagnosis description may be provided to describe the diagnostic features. The images in the library may be organized by their diagnostic categories. In a preferred embodiment of the invention, the following categories and subcategories are stored in and provided by the image library:

1. Superficial Squamous Cell
2. Intermediate Squamous Cell
   2.1 Round
   2.2 Oval
3. Squamous Metaplastic Cell
   3.1 Primitive
   3.2 Immature
   3.3 Mature
4. Atrophic Squamous Cell
5. Endocervical Glandular Cell
6. Single Endometrial Gland Cell
7. LSIL
   7.1 HPV
   7.2 Mild Dysplasia
8. HSIL
   8.1 Moderate Dysplasia
   8.2 Severe Dysplasia
      8.2.1 Metaplastic
      8.2.2 Keratinizing
   8.3 CIS
      8.3.1 Large Cell
      8.3.2 Intermediate Cell
      8.3.3 Small Cell
9. Invasive Carcinoma
   9.1 Small Cell Squamous
   9.2 Large Cell Squamous
   9.3 Keratinizin
10. Marked Repair or Reactive
    10.1 Squamous
    10.2 Metaplastic Cell
    10.3 Endocervical Cell
11. Atypical
    11.1 Endocervical Col. Cell
    11.2 Endometrial Cell
    11.3 Squamous Cell
    11.4 Metaplastic Cell
12. AIS, Endocervical Col. Cell
13. Adenocarcinoma
    13.1 Endocervical Cell
    13.2 Endometrial Cell
    13.3 Metaplastic
14. Herpes
15. Parakeratosis
16. Miscellaneous Rare Malignant NeoPlasm's
17. Look-likes The images may be stored in a band pass image decomposition format. In this way, data representing the images may be progressively transmitted. At first a coarse resolution of the images may be transmitted for display. If desirable, the finer resolution information will be transmitted. In this way, images can be progressively built up to the finest resolution. This is an efficient way of showing the images stored in the library.

Figure 8:
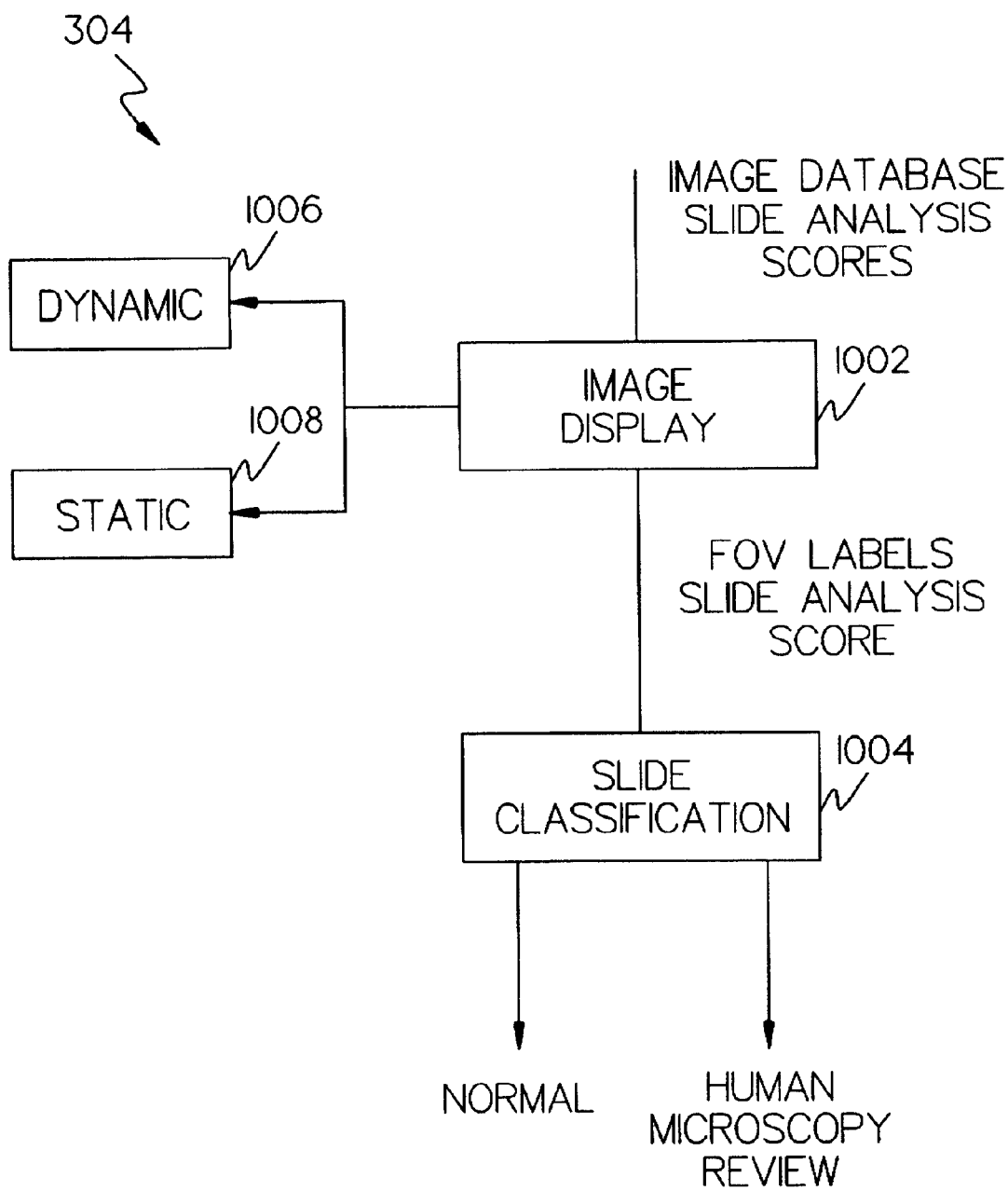
FIG. 8 is a method flow diagram illustrating data flow of an image display and case classification stage in accordance with the subject invention.

Now referring to FIG. 8, a method flow diagram of the image display and case classification stage 304 is shown.

This stage includes an image display step 1002 to show the saved images and a slide classification stage 1004 to classify each slide under review as requiring human microscopy review or as normal.

The stored field-of-view images may advantageously be displayed in sequence. Multiple fields-of-view may be displayed simultaneously. The sequence of display is based on the ranking of the field-of-view scores. Multiple options may advantageously be provided in a display mode for each field-of-view including a dynamic display mode 1006 and a static display mode 1008. In the dynamic display mode 1006, the viewer operating a computer and input device (keyboard, mouse, joy stick) may choose to display images of multiple focal planes or move to the adjacent regions of the fields-of-view. The images of the adjacent regions are derived from a magnified version of the acquired coarse image of the field-of-view. In the static mode 1008, only one image is displayed for each field-of-view.

Options may be provided to select the images for display in both modes. The available images include the best focused image, focal enhanced image, and the expanded focus image.

Options may be provided for monochrome, gray scale display of images acquired at the primary wavelength, $l_0$, or for polychrome displays incorporating information from the alternative wavelengths, $L_{i \ldots n}$. In a preferred embodiment of the invention, a monochrome value for any given pixel is determined by assignment of the gray scale value in the primary wavelength, $I_{l0}$, to each of the three color planes of the display, R, G and B. In one embodiment of the invention, a fully-tinted, polychrome value for any given pixel is determined by the weighted linear combination of the gray scale values for each of the wavelengths, $1_{0 \ldots n}$.

In addition, viewers may choose to display reference images and members of the library 336 of representative images. The images may be displayed in a coarse to fine fashion by showing multiple images at coarse resolution and then allowing the viewer to select a subset of the images for finer resolution display.

A human reader reviews the fields-of-view and is directed to label suspicious fields-of-view. To overcome the false positive problem, microscopy review is not required for a slide even if some suspicious fields-of-view are identified during human image review process. A known sequential testing scheme may be used to classify a slide. One detailed method of sequential testing is described in Wald, A, "Sequential Analysis," Wiley, New York, 1947.

Figure 9:
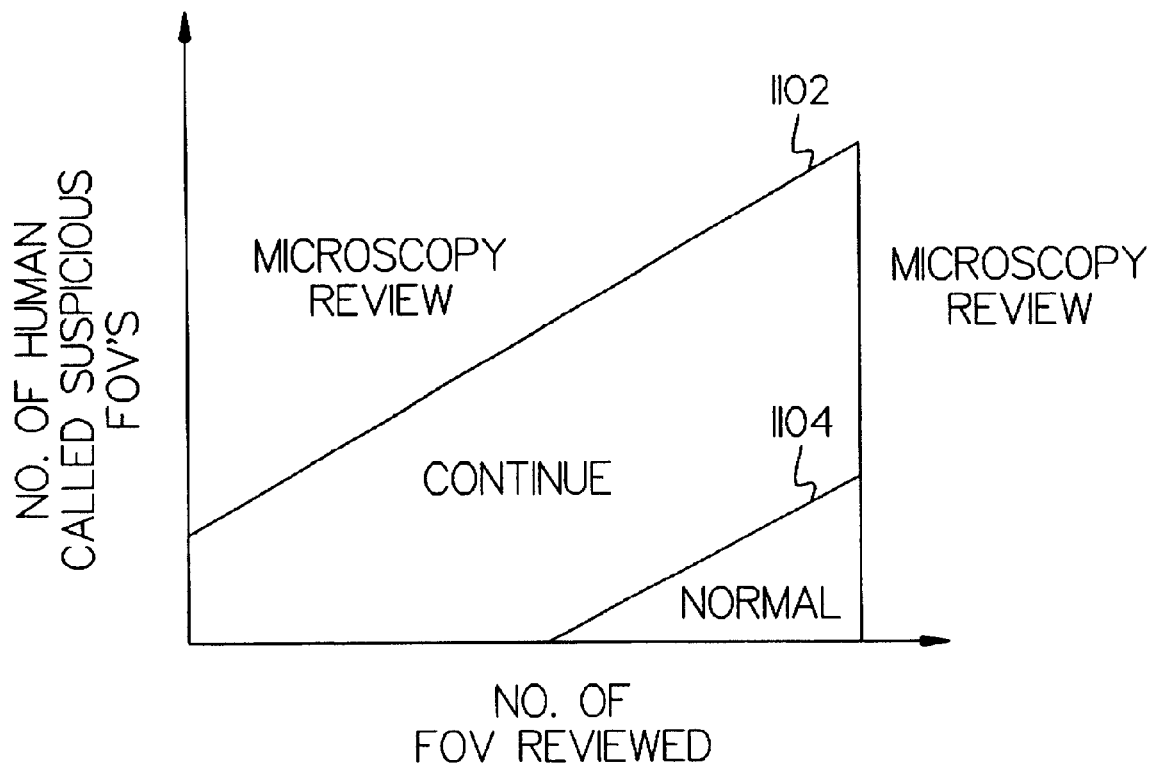
FIG. 9 illustrates an example of case decision boundaries as employed in one example of the invention.

Now referring to FIG. 9, a graph of case decision boundaries is shown. The human labeling results are tracked and two decision boundaries are established as a function of the reviewed field-of-view count vs. the number of detected suspicious fields-of-view.

When the suspicious field-of-view count rises above the microscopy review boundary 1102, the image review mode stops and the slide requires human microscopy review. When the suspicious field-of-view count falls below the normal boundary 1104, the image review mode stops and the slide is called normal. Otherwise, the image review mode continues until all fields-of-view are reviewed. At this time, the slide will require human microscopy review.

Figure 10:
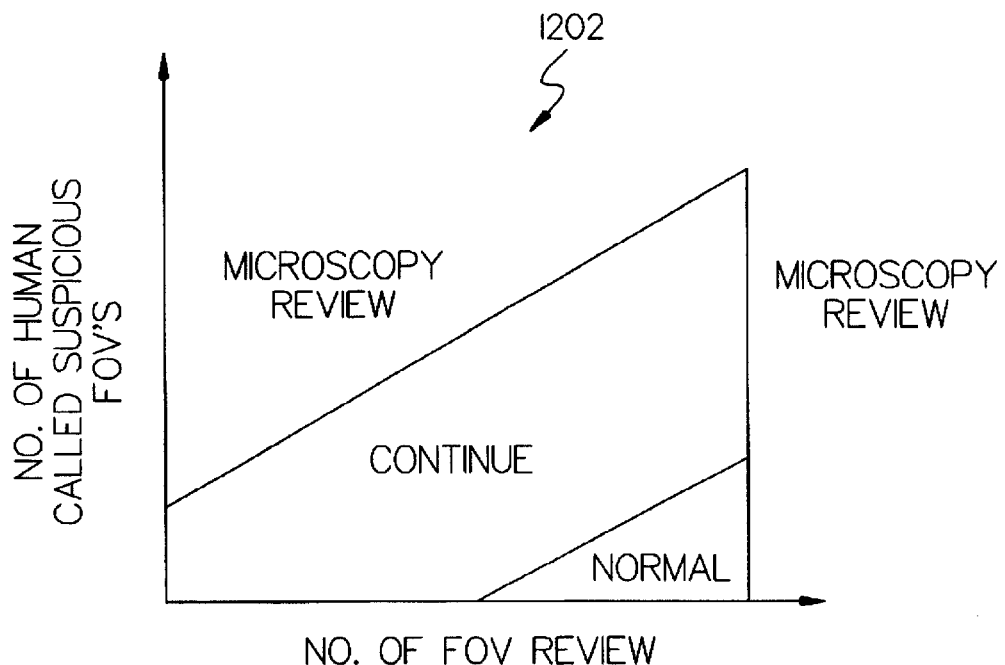
FIGS. 10 and 11 illustrate other examples of case decision boundaries as employed in accordance with the subject invention for high analysis scores and low analysis scores respectively.
Figure 11:
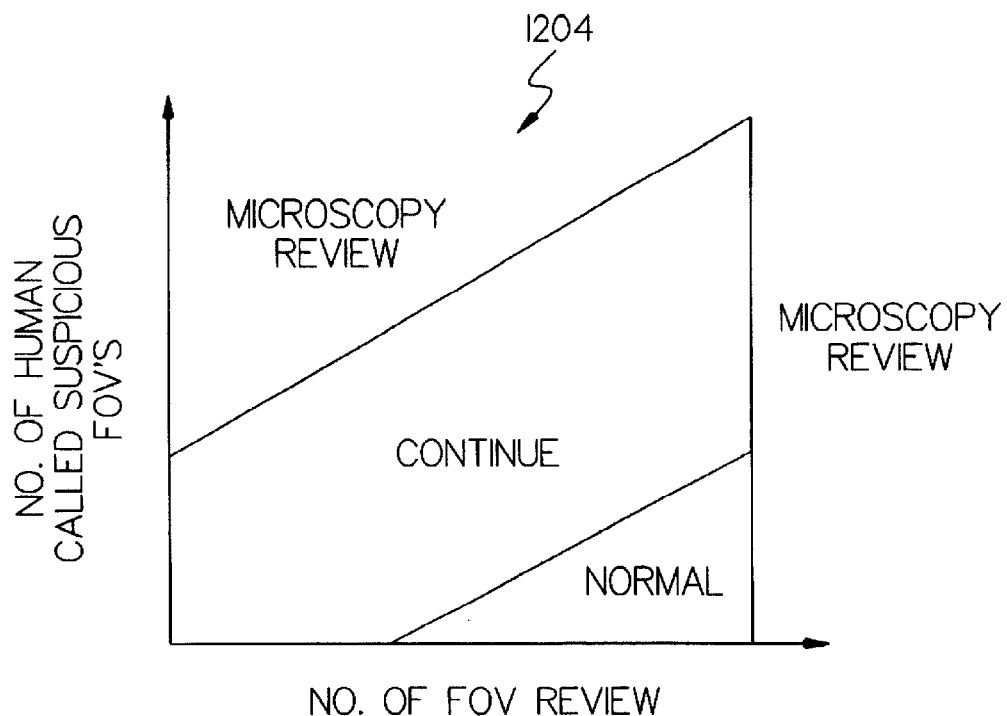

Now referring to FIGS. 10 and 11, decision boundaries are shown for slides having high analysis scores in FIG. 10 and slides having low analysis scores in FIG. 11. The decision boundaries are determined based on the initial analysis score values. The microscopy review region 1202 is bigger for the slides having high analysis score values. Conversely, the microscopy review region 1204 is smaller for the slides having low analysis score values.

The method of the subject invention is particularly suited for use with image analysis systems constructed for analysis of cytological specimens and, more particularly, for analysis of the characteristics of the cells of the specimen. However, the subject invention is generally applicable to any system for processing image data and, therefore, could be readily adapted to be used in many areas of image analysis such as machine vision, semiconductor inspection, etc. Accordingly, although the subject invention is described herein by reference to an image analysis system constructed to analyze cervical Pap smears, those skilled in the art will recognize that the invention is applicable to many areas of image analysis.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An interactive process for sorting biological specimens comprising the steps of:
    (a) automatically processing a biological specimen to provide an analysis score;
    (b) automatically sorting the biological specimen according to the analysis score into categories including a clearly normal category, an interactive review category, and a microscopy review category;
    (c) automatically selecting at least one field-of-view for any biological specimen automatically sorted into the interactive review category;
    (d) expanding depth of focus;
    (e) processing an image in a selected field-of-view using a low pass decomposition wherein the low pass decomposition comprises a sequence of copies of an original image in which both sample density and resolution are decreased in regular or irregular steps, and wherein reduced resolution levels of the low pass decomposition are themselves obtained through a highly efficient iterative algorithm; and
    (f) processing an image in a selected field-of-view using band pass decomposition wherein the step of processing an image in a selected field-of-view using band pass decomposition further includes the steps of:
        (i) processing an image wherein a zero$^{th}$ level of the low pass decomposition, $L_0$, is equal to the original image and wherein a processed image is linearly or morphologically low pass filtered and down-sampled to obtain a next decomposition level $L_1$,
        (ii) filtering $L_1 \times L_1$ in a similar way and down-sampling to obtain $L_2$, and
        (iii) repeating steps a) and b) so as to generate remaining low pass decomposition levels according to relationships including $L_0 = I$, and $L_i = D(F(L_{i-1}))$, for $i >= 1$, where a function F comprises a low pass filter operation, and a function D comprises a down-sample operation.

2. The interactive process for sorting biological specimens of claim 1 further comprising the steps of processing and enhancing the at least one field-of-view.

3. The interactive process for sorting biological specimens of claim 1 further comprising the steps of:
   (a) saving at least one image of at least one selected field-of-view for a biological specimen automatically sorted into the interactive review category; and
   (b) displaying the automatically selected at least one field-of-view to a human reader and classifying the biological specimen based on a combination of a computer score and human review results.

4. The interactive process for sorting biological specimens of claim 3 wherein the step of saving at least one image further comprises the step of acquiring multiple images, wherein each of the multiple images are acquired from a different focal plane.

5. The interactive process for sorting biological specimens of claim 3 further comprising the step of providing a library of images corresponding to representative cell types from biological specimens for displaying to the human reader for comparison with the automatically selected at least one field-of-view.

6. The interactive process for sorting biological specimens of claim 5 wherein the library of images are displayed in a coarse to fine fashion by showing multiple images at coarse resolution and then allowing a viewer to select a subset of the library of images for finer resolution display.

7. The interactive process for sorting biological specimens of claim 5 wherein the step of providing a library further includes organizing of images in the library by diagnostic categories.

8. The interactive process for sorting biological specimens of claim 3 further comprising the step of dynamically determining a number of fields-of-view for each biological specimen.

9. The interactive process for sorting biological specimens of claim 8 further comprising the step of acquiring a best-focused image at a coarse resolution for each automatically selected field-of-view so as to provide contextual information.

10. The interactive process for sorting biological specimens of claim 9 wherein the best-focused image at a coarse resolution comprises half the resolution of a high resolution image.

11. The interactive process for sorting biological specimens of claim 3 further comprising the step of compressing images by saving one image first and then saving only a difference between each consecutive image pair.

12. The interactive process for sorting biological specimens of claim 11 further comprising the step of compressing saved images by a lossless image compression method so as to produce a high image compression ratio.

13. The interactive process for sorting biological specimens of claim 12 wherein the lossless image compression method comprises run-length encoding.

14. The interactive process for sorting biological specimens of claim 12 wherein the lossless image compression method comprises Huffman coding.

15. The interactive process for sorting biological specimens of claim 11 further comprising the step of compressing saved images by a lossy image compression method so as to produce a high image compression ratio.

16. The interactive process for sorting biological specimens of claim 3 wherein the step of classifying the biological specimen based on a combination of a computer score and human review results further comprises the steps of:
   (a) establishing at least two decision boundaries as a function of a reviewed field-of-view count versus a number of detected suspicious fields-of-view to determine a suspicious field-of-view count;
   (b) when the suspicious field-of-view count rises above a microscopy review boundary, then stopping image review;
   (c) when the suspicious field-of-view count falls below a normal boundary, then stopping image review and identifying the biological specimen as normal; and
   (d) otherwise, continuing image review.

17. The interactive process for sorting biological specimens of claim 16 wherein the at least two decision boundaries are determined by initial analysis score values.

18. The interactive process for sorting biological specimens of claim 1 wherein the step of automatically selecting at least one field-of-view further comprises the steps of:
   (a) acquiring a plurality of image fields-of-view from the biological specimen;
   (b) processing each of the plurality of image fields-of-view with a single cell detection process;
   (c) processing each of the plurality of image fields-of-view with a cell group detection process; and
   (d) processing each of the plurality of image fields-of-view with a thick group detection process.

19. The interactive process for sorting biological specimens of claim 18 further comprising the steps of:
   (a) integrating each of the plurality of image fields-of-view; and
   (b) selecting at least one image field-of-view to present to a human operator.

20. The interactive process for sorting biological specimens of claim 19 further comprising a step of selecting fields-of-view from the at least one field-of-view according to determined confidence levels from information contained in the at least one field-of-view, including information from a single cell detection process, group cell detection process and thick group detection process.

21. The interactive process for sorting biological specimens of claim 18 wherein the single cell detection process detects and classifies a majority of free-lying objects in the at least one field-of-view according to probability of malignancy.

22. The interactive process for sorting biological specimens of claim 18 wherein the single cell detection process detects clearly normal cells for use as reference cells to assist human review decision.

23. The interactive process for sorting biological specimens of claim 18 wherein the cell group detection process further comprises the steps of:
   a) detecting groups of cells formed in sheet or syncytium arrangements; and
   b) classifying detected groups of cells.

24. The interactive process for sorting biological specimens of claim 18 wherein the step of classifying detected groups of cells classifies detected groups of cells as one of polymorphonuclear leukocytes, squamous cell groups, endocervical and metaplastic cell groups, and abnormal cell groups.

25. The interactive process for sorting biological specimens of claim 18 wherein the thick group detection process further comprises the steps of:
   a) detecting thick groups of cells formed as three-dimensional clusters; and
   b) classifying detected thick groups of cells.

26. The interactive process for sorting biological specimens of claim 18 wherein the thick group detection process classifies detected thick groups of cells as normal cell clusters, endometrial cell clusters, or abnormal cell clusters.

27. The interactive process for sorting biological specimens of claim 1 wherein the biological specimen comprises a Papanicolaou smear.

28. The interactive process for sorting biological specimens of claim 1 further comprising the step of image enhancing by optical sectioning.

29. The interactive process for sorting biological specimens of claim 1 wherein the step of expanding the depth of focus further comprises the step of constructing a single image with an extended depth-of-field by combining in-focus portions of the automatically selected at least one field-of-view from images acquired from different focal planes.

30. The interactive process for sorting biological specimens of claim 1 wherein the step of expanding the depth of focus further comprises multiresolution decomposition and synthesis.

31. The interactive process for sorting biological specimens of claim 1 wherein the low pass filter operation comprises a linear convolution filter operation.

32. The interactive process for sorting biological specimens of claim 31 wherein the low pass filter operation comprises a nonlinear, morphological filter.

33. The interactive process for sorting biological specimens of claim 31 wherein the step of down-sampling further comprises the steps of skipping alternate pixels and alternate lines of the image.

34. The interactive process for sorting biological specimens of claim 31 wherein the low pass decomposition comprises filtering an original image with a set of equivalent linear or nonlinear neighborhood functions, wherein the set of equivalent linear or nonlinear functions increase in width with each level that is in proportion to a down-sample factor.

35. The interactive process for sorting biological specimens of claim 31 wherein the function F comprises a linear Gaussian convolution having a five point kernel and a down-sample ratio of two in each dimension.

36. The interactive process for sorting biological specimens of claim 31 wherein levels of the band pass decomposition, $B_i$, are specified in terms of the low pass decomposition levels as follows:

$$Bi=L_i-L(EXP(L_{i+1})),$$

where L(.) comprises a multidimensional linear low pass filter and EXP(.) comprises a multidimensional data replication.

37. The interactive process for sorting biological specimens of claim 31 wherein, given an image, the step of processing an image band pass decomposition decomposes the image into different bands in spatial frequency or morphological pattern scale wherein resulting linear band pass images represent pattern components restricted in a spatial-frequency domain and also restricted to local volumes in a spatial domain.

38. The interactive process for sorting biological specimens of claim 37 wherein, to recover $L_i$, a low pass decomposition level $L_{i+1}$ is repeatedly interpolated and added to $B_i$ to recover $L_{i-1}$. $L_{i-2}$, and so on until the original image is recovered according to relationships including $$L_i=B_i+L(EXP(L_{i+1})) \text{ for all, i.e. } \{1, \ldots, N-1\}, \text{ and } I=L_0=B_0+L(EXP(L_1)).$$

39. The interactive process for sorting biological specimens of claim 1 wherein band pass decomposition comprises the steps of:

a) subtracting a low pass decomposition level from a next lower level in the band pass decomposition; and b) interpolating new sample values between those in a given level before that level is subtracted from the next lower level wherein the step of interpolating comprises point by point replication followed by linear low pass filtering.

40. The interactive process for sorting biological specimens of claim 1 further comprising the step of deploying multiple color filters to acquire color images for display.

41. The interactive process for sorting biological specimens of claim 40 wherein the step of deploying multiple color filters further comprises the step of acquiring gray scale images wherein additional images may be taken of a best focused image at alternate wavelengths, $l_i$.

42. An interactive process for sorting biological specimens comprising the steps of:
   (a) automatically processing a biological specimen to provide an analysis score;
   (b) automatically sorting the biological specimen according to the analysis score into categories including a clearly normal category an interactive review category, and a microscopy review category;
   (c) automatically selecting at least one field-of-view for any biological specimen automatically sorted into the interactive review category;
   (d) expanding depth of focus;
   (e) processing an image in a selected field-of-view using a low pass decomposition wherein the low pass decomposition comprises a sequence of copies of an original image in which both sample density and resolution are decreased in regular or irregular steps, and wherein reduced resolution levels of the low pass decomposition are themselves obtained through a highly efficient iterative algorithm;
   (f) processing an image in a selected field-of-view using band pass decomposition; and
   (g) wherein the step of expanding the depth of focus further comprises the steps of:
      (i) decomposing an image from each focal plane into linear basis functions using a band pass decomposition;
      (ii) applying an image synthesis process to construct a focus expanded image wherein each band pass level is selected from multiple focal plane representations corresponding to image decompositions of a level which represents image information that is most in-focus; and
      (iii) wherein determining a degree of focus depends upon a measure of reduced amplitude of individual band pixel values and wherein, for a given composite decomposition level, a corresponding source decomposition level that is most in-focus is identified as that which has a highest absolute value.

43. An interactive process for sorting biological specimens comprising the steps of:
   (a) determining a review field-of-view list;
   (b) dynamically determining a best focused image;
   (c) dynamically determining a number of images to take from focal planes above and below a best focused image;
   (d) acquiring multiple images from different focal planes for each field-of-view on the review field-of-view list by;
      (i) acquiring a best focused image and determining its image content;
      (ii) moving a fixed step above a current focus position, acquiring a next image and measuring its image content;

(iii) determining an image content ratio between the best focused image and the next image;
(iv) repeating steps ii–iii as long as the image content ratio is above a predetermined minimum content ratio;
(v) moving a fixed step below the current focus position, acquiring a next image and measuring its image content;
(vi) determining an image content ratio between the best focused image and the next image; and
(vii) repeating steps ii–iii as long as the image content ratio is above a predetermined minimum content ratio.

44. The method of claim 43 further comprising the steps of:
(a) processing a plurality of fields-of-view to determine the presence of seed fields-of-view and to provide a review field-of-view list;
(b) determining adjacent fields-of-view for the fields-of-view determined to be seed fields-of-view;
(c) acquiring the adjacent fields-of-view;
(d) processing the adjacent fields-of-view to determine the presence of seed fields-of-view and for possible inclusion on the review field-of-view list; and
(e) repeating steps b–d until there are no more changes in the review field-of-view list.

45. The interactive process for sorting biological specimens of claim 43 wherein the best focused image is defined as an image having a highest image content measure.

46. The interactive process for sorting biological specimens of claim 43 further including the step of compressing images by saving only one image and the difference between each consecutive image pair.

47. The interactive process for sorting biological specimens of claim 46 further comprising the step of compressing the images by lossless image compression.

48. The interactive process for sorting biological specimens of claim 47 further comprising the step of compressing the images by lossy image compression.

49. The interactive process for sorting biological specimens of claim 43 further comprising the steps of using the multiple images from different focal planes for image enhancement by optical sectioning, image depth of focus expansion, and support for adjustable focus during image display.

50. An interactive process for sorting biological specimens comprising the steps of:
(a) automatically processing a biological specimen to provide an analysis score;
(b) automatically sorting the biological specimen according to the analysis score into categories including a clearly normal category, an interactive review category, and a microscopy review category;
(c) automatically selecting at least one field-of-view for any biological specimen automatically sorted into the interactive review category;
(d) image enhancing by optical sectioning; and
(e) determining an enhanced image I_j for an image plane, an observed image at j, O_j, and a plurality of observed images above the image plane, O_(j−1), and an image below the image plane, O_(j+1) and performing an operation defined as:

$$I\_j = C2 \, (O\_j - C1 \, MAX(S*O\_(j-1), S*O\_(j+1)))$$

where MAX(x,y) comprises a point-by-point maximum of a plurality of pixel values of the images x and y, and S comprises a contrast transfer function.

51. An interactive process for sorting biological specimens comprising the steps of:
(a) automatically processing a biological specimen to provide an analysis score;
(b) automatically sorting the biological specimen according to the analysis score into categories including a clearly normal category, an interactive review category, and a microscopy review category;
(c) automatically selecting at least one field-of-view for any biological specimen automatically sorted into the interactive review category;
(d) expanding depth of focus by:
(i) decomposing an image from each focal plane into linear basis functions using a band pass decomposition;
(ii) applying an image synthesis process to construct a focus expanded image wherein each band pass level is selected from multiple focal plane representations corresponding to image decompositions of a level which represents image information that is most in-focus; and
(iii) wherein determining a degree of focus depends upon a measure of reduced amplitude of individual band pixel values and wherein for a given composite decomposition level, wherein a corresponding source decomposition level that is most in-focus is identified as that which has a highest absolute value.

* * * * *